Aug. 19, 1958   G. W. PIERCE ET AL   2,848,174
SEMI-AUTOMATIC ROLL FILM STRIPPING APPARATUS
Filed Sept. 7, 1956   4 Sheets-Sheet 2

GEORGE W. PIERCE
DAVID C. SEELBINDER
WALTER B. HAUSLER
INVENTORS

BY Daniel S. Mayne.

Paul R. Holmes
ATTORNEYS

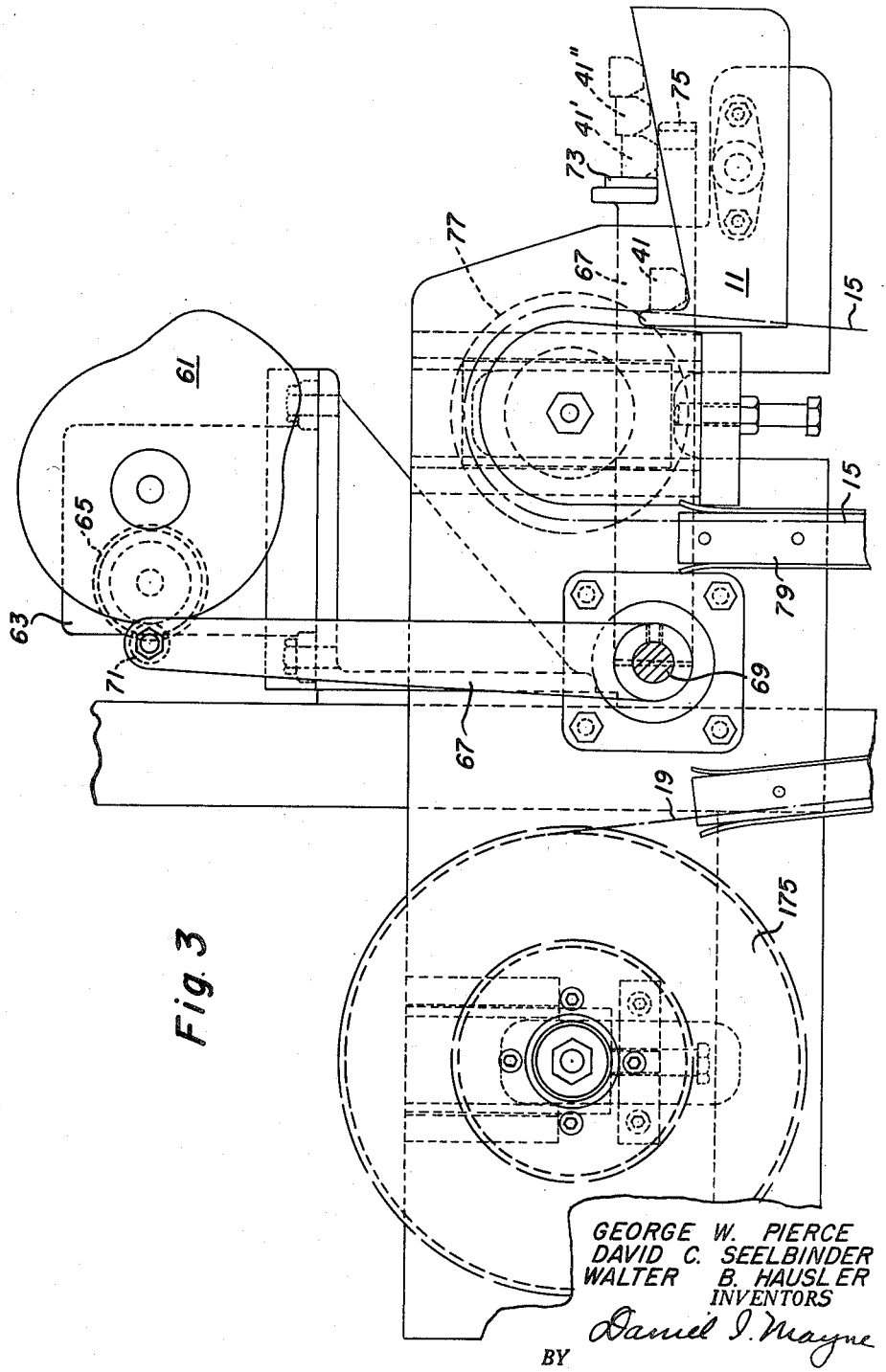

Aug. 19, 1958   G. W. PIERCE ET AL   2,848,174
SEMI-AUTOMATIC ROLL FILM STRIPPING APPARATUS
Filed Sept. 7, 1956   4 Sheets-Sheet 4
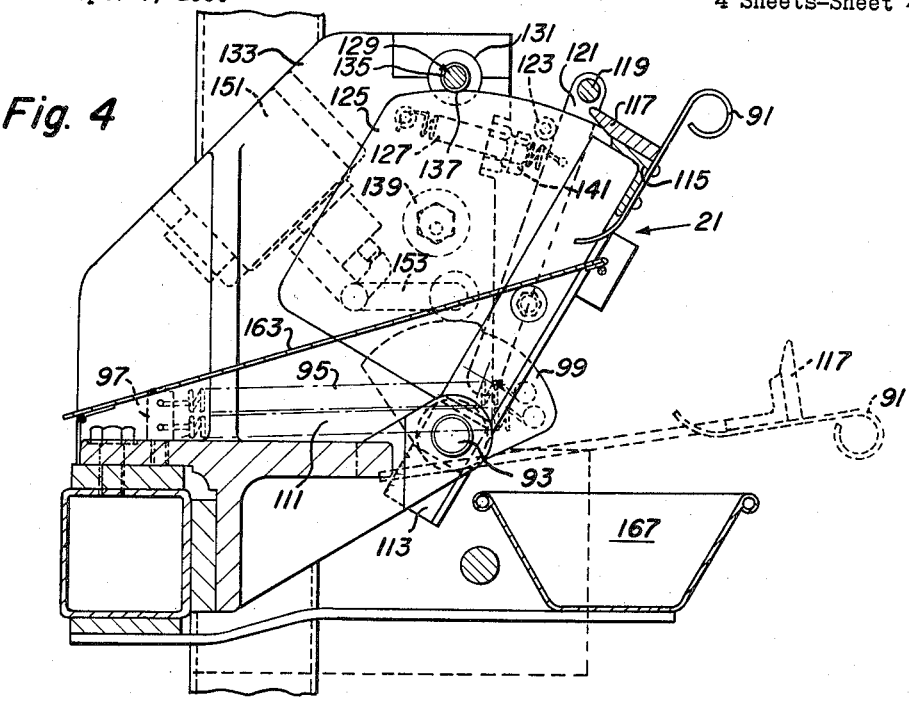
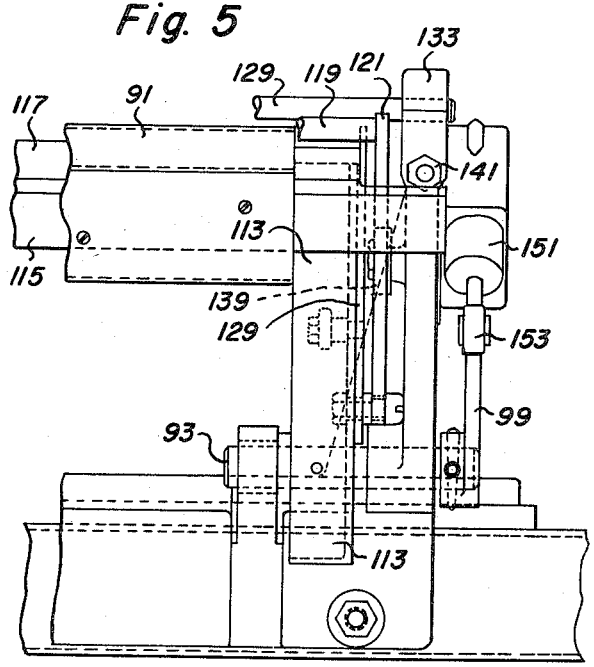
GEORGE W. PIERCE
DAVID C. SEELBINDER
WALTER B. HAUSLER
INVENTORS
BY Daniel I. Mayne,
Paul R. Holmes
ATTORNEYS

United States Patent Office 2,848,174
Patented Aug. 19, 1958

2,848,174

SEMI-AUTOMATIC ROLL FILM STRIPPING APPARATUS

George W. Pierce, David C. Seelbinder, and Walter B. Hausler, Rochester, N. Y., assignors to Eastman Kodak Company, Rochester, N. Y., a corporation of New Jersey Application September 7, 1956, Serial No. 608,539

4 Claims. (Cl. 242—55)

This invention relates to a strip handling apparatus and more particularly to a semi-automatic machine for simultaneously stripping a plurality of film strips from the film carrying spools.

Roll film wound on a film spool together with a paper backing must be separated from the spool and paper backing and suspended in a rack prior to processing. The process of unwinding and separating the film from the paper backing and the spools is referred to in the art and throughout this specification and claims as stripping. Prior to the development of the present invention, each individual roll of film had to be stripped manually and hung on the processing rack. Since the usual rack accommodates six rolls of film, this hand operation required a considerable amount of space and resulted in operator fatigue. The semi-automatic roll film stripping machine of the present invention comprises broadly a fixed bar and a pivotally mounted stripping bar between which a plurality of film strips are suspended and which retain from withdrawal the coils of partially unrolled paper backings and the film spools on which the remaining portions of the film strips and paper backings are wound. The bars are spaced to permit the film strips to pass freely therebetween and means is provided for carrying each of the plurality of film strips simultaneously away from the bars thereby stripping the film strips.

The primary object of the present invention is, therefore, to provide a semi-automatic roll film stripping apparatus wherein a plurality of film strips can be simultaneously stripped from the film carrying spools and paper backings.

Another object of the present invention is to provide a semi-automatic roll film stripping apparatus for simultaneously stripping a plurality of film strips from the carrying spools and comprises means for supporting an end of each of a plurality of film strips between a fixed bar and pivotally mounted stripping bar which retain the spools and coils of paper backing while the support means is carried away from the bars thereby stripping the film strips.

Other objects and advantages of the present invention will become readily apparent to those skilled in the art from the following description with reference to the drawings in which like characters denote like parts and wherein:

Fig. 3 is an enlarged elevation view illustrating in detail the processing rack supply hopper and a portion of the rack transporting mechanism of the strip handling apparatus; and Figs. 4, 5 and 6 are enlarged views illustrating the semi-automatic roll film stripping apparatus of our invention as utilized in the disclosed strip handling machine.

Figure 1:
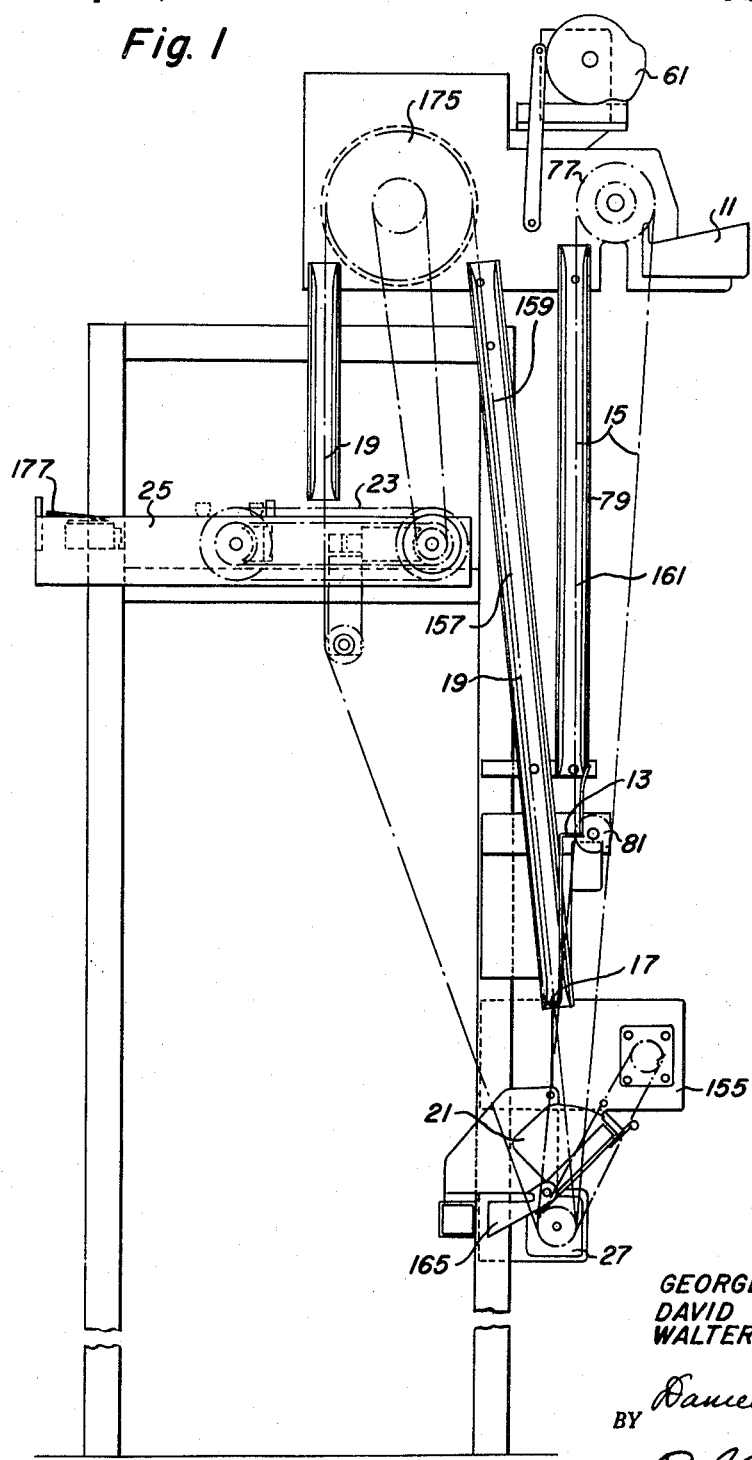
Fig. 1 is a side elevation view of a strip handling machine utilizing the semi-automatic roll film stripping apparatus of our invention.

As illustrated in Fig. 1, the processing racks are conveyed from the supply hopper 11 to a ready position indicated at 13 by means of an endless chain conveyor 15. The racks are then manually transferred by the operator to the stripping position indicated at 17 and there engaged by the endless chain conveyor 19. The backing paper and spools are positioned in the stripping device 21 and the rack is raised by the conveyor 19 to strip simultaneously each film strip from the backing paper and carrying spools. The conveyor 19 is halted at a position permitting the operator to sever the film strips from the backing papers and to attach weighted clamps (not shown) to the depending film strip ends. The next movement of conveyor 19 transports the rack to the endless belt 23 which advances the rack to the receiving hopper 25 from which the rack can be removed and the processing of the film strips can be accomplished in the known manner. The belts 23 and the conveyors 15 and 19 are driven simultaneously and in synchronism with each other by means of the motor 27 as will be hereinafter more fully described.

Figure 2:
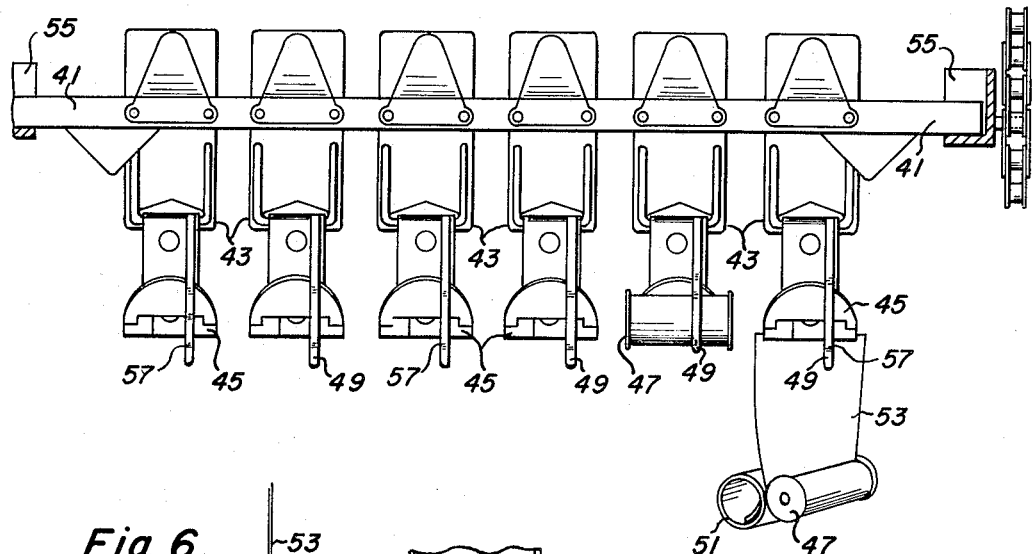
Fig. 2 is an enlarged view of a processing rack for supporting a plurality of film strips and illustrating the conveyor mounted cups which engage the ends of the rack permitting the transport thereof in the apparatus of our invention.

Further details of the invention will now be described with reference to the other more detailed figures of the drawings. One of the processing racks utilized in the present invention is illustrated in Fig. 2 and comprises a bar 41 to which is mounted six supports 43 for carrying film clips 45. As is known in the art the clips 45 grip one of the ends of each of the film strips to support the film strips during movement of the rack through the processing cycle. Prior to the depositing of the rack in the supply hopper 11, the tightly wound film containing spools 47 are supported by means of the spring lever 49 on the clips 45. Then after the rack is moved to the stripping position 17, the spools 47 are removed from the lever 49 and the paper backing 51 is manually unrolled to the point where the end of the film strip 53 can be attached to the clip 45. The operator then permits the unrolled coils of paper backing 51 and the film spool 47 containing the remaining portion of the film strip 53 and paper backing 51 to hang from the clips 45, the natural curl in the film strip 53 and paper backing 51 being sufficient to support the spool 47 without its further unwinding. The bar 41 of the rack is supported by cups 55 which are pivotally mounted in opposed relation on each of the opposed chains which form conveyors 15 and 19.

Supply hopper 11 is shown in detail in Fig. 3. The bars 41, 41', 41" of the successive processing racks are placed in hopper 11 and slide due to gravitational force toward the conveyor 15. A feeding device is provided to prevent possible jamming of the conveyor 15 and to secure the desired intermittency in moving each rack to the ready position 13. The feeding device comprises cam 61 driven through the gear reducer 63 from a chain (not shown) which engages sprocket 65 on the gear reducer 63 and is driven by the motor 27, and a bell crank lever 67 which is pivotally supported on a shaft 69 carried in the frame of the machine. A cam follower 71 is mounted on one end of lever 67 and is maintained in engagement with the cam 61 by the weight of the other end of the lever 67. The said other end of lever 67 is provided with a first stop 73 and a second stop 75. First stop 73 is a lever which engages bar 41' of the second rack to prevent it from being picked up by conveyor 15 along with bar 41 of the first rack. The second stop 75 is a lever which normally is out of engagement with the racks but which moves into engagement with the bar 41" of the succeeding rack to prevent said succeeding rack and the adjacent racks from sliding down the inclined hopper along with bar 41' when the stop 73 is raised by the action of cam 61. Thus only one rack at a time is permitted to be picked up and transported to ready position 13 by the conveyor 15 which passes over adjustably mounted sprocket 77 and is guided by the chain guides 79, one chain guide and one sprocket being provided for each opposed chain forming the conveyor 15. Similarly one chain guide is provided for each opposed chain forming the conveyor 19.

When the rack has been transported to ready position 13, the ends of bar 41 are supported on the step forming ready position 13 and a microswitch (not shown) adjacent the step, is actuated to halt the operation of the motor 27 and thus stop the movement of all of the conveyors including conveyor 15. The rack is then manually moved from ready position 13 to stripping position 17 thus releasing the microswitch adjacent the step and permitting motor 27 to drive the conveyor 15 and thus move the opposed cups 55 around the small sprockets 81 and back up to the hopper 11 preparatory to picking up the next rack. The ends of bar 41 rest in the opposed U-shaped supports provided at stripping position 17 as is best illustrated in Fig. 1. The retractable bar assembly of the stripping device 21 is then in the dotted position shown in Fig. 4 having been manually lowered thereto to initiate the movement of conveyor 15 to bring the rack to the ready position 13. The retractable bar assembly is moved by pulling the handle 91 and pivoting the device 21 about the opposed studs 93 against the bias of coil spring 95 which is mounted on a stationary pin 97 and connected to the cam 99 fixed with respect to the retractable bar assembly and mounted on one of the studs 93. Another coil spring 111 is connected immediately below the spring 95 on the pin 97 and the cam 99 and acts as a holding spring to retain the retractable assembly in the lowered position because of its over-center position with respect to the pivot studs 93 when the retractable assembly is in the lowered position. The frame of the retractable bar assembly comprises two side members 113, which are supported on studs 93, and cross brace 115 on which the stripping bar 117 is fixed. Because it is essential that bar 117 does not scratch the surfaces of the film strips 53 which pass over the edge thereof during stripping and since the edges of the spools 47 contact and rotate against bar 117, it is desirable to utilize a highly polished and very hard stainless steel such as for example a highly polished stainless steel which is subsequently heat treated in a nitriding atmosphere such as by the Scottsonizing process done by the C. U. Scott & Son of Rock Island, Illinois. Bar 117 is ground to present an edge of limited area which engages the film strips during stripping thereof. A positioning bar 119 is carried by the retractable bar assembly and is supported by means of the bar supports 121 which are pivotally mounted on the side members 113. The positioning bar 119 is biased to a raised position against the stop 123 carried by side plates 125, by means of the coil spring 127 connected between the plates 125 and the bar supports 121. As the retractable bar assembly is raised, the bar 119 first engage the clips 45 in the indented portion of spring lever 49 indicated at 57 in Fig. 2 to align and straighten clips 45 against the fixed bar 129. This is particularly important with certain types of clips with which crookedly mounted rolls frequently occur and cause jamming of the strip handling machine. In order to prevent scratching of the film strips 53 as they pass over fixed bar 129, the bar 129 is rotatably mounted in bearings 131 carried in stationary frame 133 and is formed of a steel rod 135 which is covered by a tube 137 of either Teflon or other similar material. With continued movement of the retractable bar assembly, bar supports 121 engage stop 139 carried on the stationary frame 133 which causes the supports 121 to pivot against the bias of spring 127 until the cross brace 115 engages the stop 141 carried in the frame 133. In this fully raised position of the retractable bar assembly illustrated in Fig. 6, the film strips 53 hanging from the clips 45 rest between stripping bar 117 and fixed bar 129 with the partly unrolled paper backing 51 and spool 47 hanging beneath the bars 117 and 129. It should be noted that the distance between bars 117 and 129 is sufficient to permit film strips 53 to pass freely therebetween but prevents the film spools 47 and the coils of unrolled paper backing 51 from passing therebetween during stripping of the film strips 53.

Pivoting the adjustable bar assembly to the fully raised position actuates the microswitch 151 as a result of movement of cam follower 153 on the surface of cam 99 and this causes the motor 27 to be energized and to drive the chain conveyor 19 thus raising the bar 41 with the attached film strips 53 away from bars 117 and 129 and stripping the film strips 53 from the paper backings 51 and spools 47.

Figure 6:
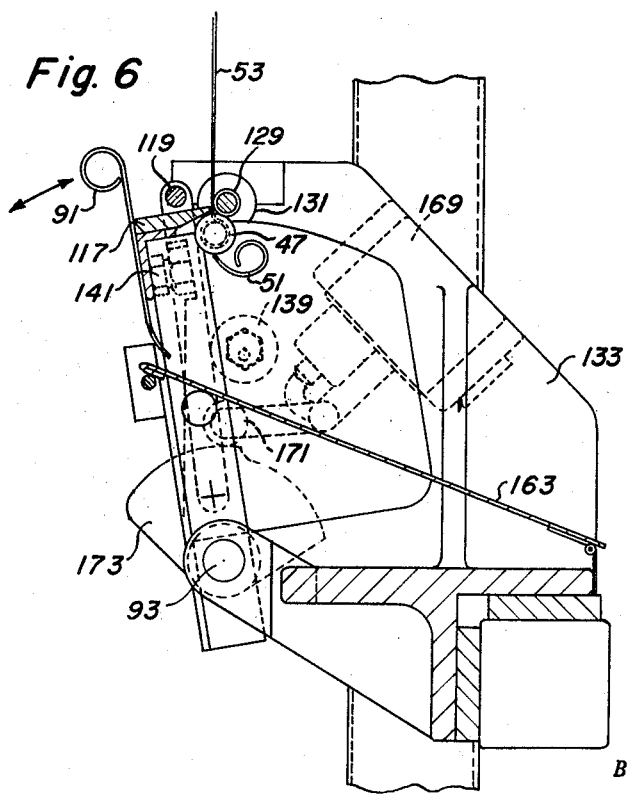

Motor 27 drives conveyor 15 simultaneously with conveyor 19 and hence the cups 55 are carried back up to hopper 11 to pick up the bar 41' of the rack which is next awaiting transport. It is desirable to halt the motor 27 at the point such that the tape (not shown) which secures the film strips 53 to the paper backing 51 is withdrawn between the bars 117 and 129 permitting the operator to cut the tape and attach weighted clamps (not shown) to the bottom ends of the film strips 53. Therefore, a cam mechanism 155, see Fig. 1, for operating microswitches (not shown) and which is directly driven by motor 27 simultaneously with conveyors 15 and 19 is utilized to stop the motor 27 after the desired conveyor travel. Obviously since some film strips are longer than others, it is necessary to provide means for selecting the proper length of conveyor travel for the particular film strip being handled at any given time. In the present machine, this is accomplished by providing a switch (not shown) for operatively connecting anyone of several different cams (not shown) in the cam mechanism 155 for actuating the microswitch in the motor circuit. It will be noted that conveyor 19, will have raised the bar 41 of the processing rack to the point 157 or 159 depending on the predetermined selection of cams in cam mechanism 155 as required in order to handle film strips of the preselected length. Since conveyor 15 is driven simultaneously with conveyor 19, the bar 41' of the succeeding rack is also advanced to a point somewhere between hopper 11 and ready position 13, such as for example to the point indicated at 161. As the operator places a weighted clamp on the ends of each of the film strips 53 which then hang freely from the processing rack, the paper backings 51 and film spools 47 thereof are dropped and roll down the inclined bottom plate 163 (Fig. 4) of the stripping device 21 into a receiving hopper 165 (Fig. 1). When the last film strip 53 is severed from the paper backing 51 and one of the weighted clamps which are stored in tray 167 is attached to the end of each of the film strips 53, the operator then manually moves the retractable bar assembly to the lower position which actuates a microswitch 169 carried on the side of frame 133 opposite cam 99 and which is operated by means of a cam follower 171 which is in engagement with cam 173 rigidly mounted on the other pivot stud 93 as is best illustrated in Fig. 6. Actuation of microswitch 169 causes motor 27 to be energized and drive conveyor 19 carrying the bar 41 of the processing rack over adjustably mounted sprocket 175 and onto the endless belt 23 which moves the rack onto the hopper 25. Simultaneously conveyor 15 moves the bar 41' of the next rack to the ready position 13 and the described operational cycle is repeated. As an added safety feature, a microswitch 177 is provided adjacent the end of hopper 25 in order to stop the motor 27 at the instant hopper 25 is filled and thereby prevent the moving of another rack into the hopper 25 which might result in the jamming and possible damaging of the racks.

It now will be appreciated by those skilled in the art that we have disclosed a semi-automatic roll film stripping apparatus for stripping a plurality of film strips simultaneously in which the film strips are stripped between a pair of parallel bars and with which many of the disadvantages of the known prior art have been substantially alleviated or eliminated. While only one embodiment of the present invention has been described, it is realized that many modifications are possible and will become readily apparent to those skilled in the art from the foregoing description which is intended therefore to be illustrative only and the scope of the invention is defined in the appended claims.

Having now particularly described our invention what we desire to secure by Letters Patent of the United States and what we claim is:

1. A device for stripping roll film from film spools and the paper backing interleaved thereon comprising a frame, a fixed bar mounted in said frame, a stripping bar parallel to said fixed bar and pivotally mounted for movement between a first position remote from said fixed bar and a second position adjacent said fixed bar, means for supporting an end of each of a plurality of film strips between said bars, positioning means engaging said supporting means for aligning said film strips between said bars, stop means carried by said frame for engaging and retracting said positioning means to a position remote from said supporting means upon movement of said stripping bar to said second position and thereby releasing said supporting means for movement away from said bars, the distance between said fixed bar and said stripping bar in said second position being sufficient to permit said film strips to pass freely therebetween but preventing said spools and coils of said paper backing from passing therebetween, and means for carrying said supporting means away from said bars thereby stripping simultaneously each of said film strips.

2. A device for stripping roll film from film spools and the paper backing interleaved thereon comprising a frame, a fixed bar mounted in said frame, a stripping bar parallel to said fixed bar and pivotally mounted for movement between a first position remote from said fixed bar and a second position adjacent said fixed bar, means for supporting an end of each of a plurality of film strips between said bars, positioning means engaging said supporting means for aligning said film strips between said bars, said positioning means comprising a positioning bar mounted parallel to said stripping bar and resiliently biased to a position for engaging said supporting means, stop means carried by said frame for engaging and retracting said positioning means to a position remote from said supporting means upon movement of said stripping bar to said second position thereby releasing said supporting means for movement away from said bars, the distance between said fixed bar and said stripping bar in said second position being sufficient to permit said film strips to pass freely therebetween but preventing said spools and coils of said paper backing from passing therebetween, and means for carrying said supporting means away from said bars thereby stripping simultaneously each of said film strips.

3. A device for stripping roll film from film spools and the paper backing interleaved thereon comprising a frame, a fixed bar mounted in said frame, a stripping bar parallel to said fixed bar and pivotally mounted for movement between a first position remote from said fixed bar and a second position adjacent said fixed bar, means for resiliently biasing said stripping bar toward said fixed bar to prevent accidental displacement of said stripping bar with respect to said fixed bar, means for supporting an end of each of a plurality of film strips between said bars with each said spool and paper backing associated therewith depending from said end of said strips, the distance between said fixed bar and said stripping bar in said second position being sufficient to permit said film strips to pass freely therebetween, said stripping bar in said second position and said fixed bar presenting adjacent surfaces for engaging said spools during stripping of said film strips and preventing said spools and coils of paper backing from passing therebetween, and means for carrying said supporting means away from said bars thereby simultaneously stripping each of said film strips.

4. A device for stripping roll film from film spools and the paper backing interleaved with said film on said spools comprising a frame, a fixed bar rotatably mounted in said frame, a stripping bar parallel to said fixed bar and pivotally mounted on said frame for movement between a first position remote from said fixed bar and a second position adjacent said fixed bar, means for resiliently biasing said stripping bar towards said fixed bar to prevent accidental displacement of said stripping bar away from said fixed bar, means for supporting an end of each of a plurality of film strips between said bars with each said spool and paper backing associated therewith depending from said end of said strips, the distance between said fixed bar and said stripping bar in said second position being sufficient to permit said film strips to pass freely therebetween, said stripping bar in said second position and said fixed bar presenting opposed adjacent surface for engaging said spools during stripping of said film strips and preventing said spools and coils of paper backing from passing therebetween, said fixed bar being enclosed in a sheath of relatively smooth material having a low coefficient of friction for lessening abrasive damage to said film strips during stripping thereof, said stripping bar being formed of a highly polished, surface hardened stainless steel and shaped to present an edge of limited surface area in contact with said film strips to thereby lessen abrasive damage to said film strips during stripping thereof, means for carrying said supporting means away from said bars thereby stripping said film strips, and means actuated in response to the movement of said stripping bar to said second position for initiating the movement of said carrying means.

References Cited in the file of this patent

UNITED STATES PATENTS

| | | |
|---|---|---|
| 1,901,928 | Olson | Mar. 21, 1933 |
| 2,730,990 | Gray et al. | Jan. 17, 1956 |